United States Patent
Kim et al.

(10) Patent No.: US 8,274,269 B2
(45) Date of Patent: Sep. 25, 2012

(54) SWITCHING CIRCUIT AND SMALL-SIZE HIGH-EFFICIENCY DC-DC CONVERTER FOR PORTABLE DEVICES INCLUDING THE SAME

(75) Inventors: Kwi Dong Kim, Daejeon (KR); Jong Kee Kwon, Daejeon (KR); Jong Dae Kim, Daejeon (KR); Yong Seo Koo, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 432 days.

(21) Appl. No.: 12/487,596

(22) Filed: Jun. 18, 2009

(65) Prior Publication Data

US 2010/0123445 A1 May 20, 2010

(30) Foreign Application Priority Data

Nov. 19, 2008 (KR) .................. 10-2008-0115049

(51) Int. Cl.
*G05F 1/00* (2006.01)

(52) U.S. Cl. ........................ 323/282; 327/534

(58) Field of Classification Search .............. 327/537, 327/534, 535, 536; 323/282; 363/60
See application file for complete search history.

(56) References Cited

U.S. PATENT DOCUMENTS

| 5,994,882 | A | 11/1999 | Ma |
| 6,049,108 | A | 4/2000 | Williams et al. |
| 6,304,110 | B1 * | 10/2001 | Hirano ........................... 327/108 |
| 6,433,623 | B1 | 8/2002 | Okutsu et al. |
| 6,917,082 | B1 * | 7/2005 | Loo ............................... 257/368 |
| 7,332,954 | B2 | 2/2008 | Ryu et al. |
| 7,669,788 | B2 | 3/2010 | Park et al. |
| 2003/0218494 | A1 | 11/2003 | Kubo et al. |
| 2006/0086988 | A1 * | 4/2006 | Sorada et al. .................. 257/369 |

FOREIGN PATENT DOCUMENTS

| EP | 1351392 A1 | 8/2003 |
| JP | 2000-196023 A | 7/2000 |
| JP | 2001-267908 | 9/2001 |
| KR | 1020050004947 A | 1/2005 |
| KR | 1020050077337 A | 8/2005 |
| KR | 1020060080421 A | 7/2006 |
| KR | 1020080025298 A | 3/2008 |
| KR | 1020080067378 A | 7/2008 |

OTHER PUBLICATIONS

Ryu et al, KR1020050077337, English Translation.*

(Continued)

*Primary Examiner* — Harry Behm
*Assistant Examiner* — Matthew Grubb (57) ABSTRACT

Provided are a switching circuit and a small-size high-efficiency direct current-to-direct current (DC-DC) converter for portable devices including the same. Using dynamic threshold-complementary metal oxide semiconductor (DT-CMOS) transistors having dynamic threshold voltages as a switching device, the switching circuit maintains a low threshold voltage in a normal mode to improve current drivability while reducing conduction loss, and maintains a high threshold voltage in a standby mode to minimize power consumption. When the switching circuit is employed in a DC-DC converter, power conversion efficiency can be improved by reducing conduction loss in the normal mode, and power consumption can be minimized in the standby mode. Consequently, the DC-DC converter can maximize a use time of a battery of a portable device and can be useful in power supplies of portable devices that are gradually being miniaturized.

15 Claims, 5 Drawing Sheets

OTHER PUBLICATIONS

Yongseo Koo et al., "The Design of DC-DC Converter with DTMOS Switch," Proceedings of the 9$^{th}$ International Conference of Electronics, Information, and Communication(ICEIC), Jun. 2008, pp. 579-582.

Fariborz Assaderaghi et al., "A Dynamic Threshold Voltage MOSFET(DTMOS) for Very Low Voltage Operation," IEEE Electron Device Letters, Dec. 1994, pp. 510-512, vol. 15, No. 12.

A. Djemouai et al., "New CMOS Integrated Pulse Width Modulator for Voltage Conversion Applications," IEEE, 2000, pp. 116-119.

* cited by examiner

SWITCHING CIRCUIT AND SMALL-SIZE HIGH-EFFICIENCY DC-DC CONVERTER FOR PORTABLE DEVICES INCLUDING THE SAME

CROSS-REFERENCE TO RELATED APPLICATION

This application claims priority to and the benefit of Korean Patent Application No. 10-2008-0115049, filed Nov. 19, 2008, the disclosure of which is incorporated herein by reference in its entirety.

BACKGROUND

1. Field of the Invention

The present invention relates to a switching circuit and a small-size high-efficiency direct current-to-direct current (DC-DC) converter for portable devices including the same, and more particularly, to a switching circuit capable of reducing power consumption in a standby mode and conduction loss in a normal mode using a dynamic threshold-complementary metal oxide semiconductor (DT-CMOS), which is a dynamic threshold voltage device, as a switching device and a small-size high-efficiency DC-DC converter for portable devices including the same.

2. Discussion of Related Art

In general, portable devices use 3.6 V nickel cadmium (NiCad), lithium (Li)-ion, or Li-polymer batteries. However, internal circuits of portable devices use a voltage of 3.3 V or 2.5 V, and thus the battery voltage of 3.6 V needs to be reduced to 3.3 V or 2.5 V.

For this reason, power supplies of portable devices include DC-DC converters for converting voltage from a high level to a low level. To use batteries for longer, most portable devices employ a switch mode power supply (SMPS) DC-DC converter having high power conversion efficiency.

Figure 1:
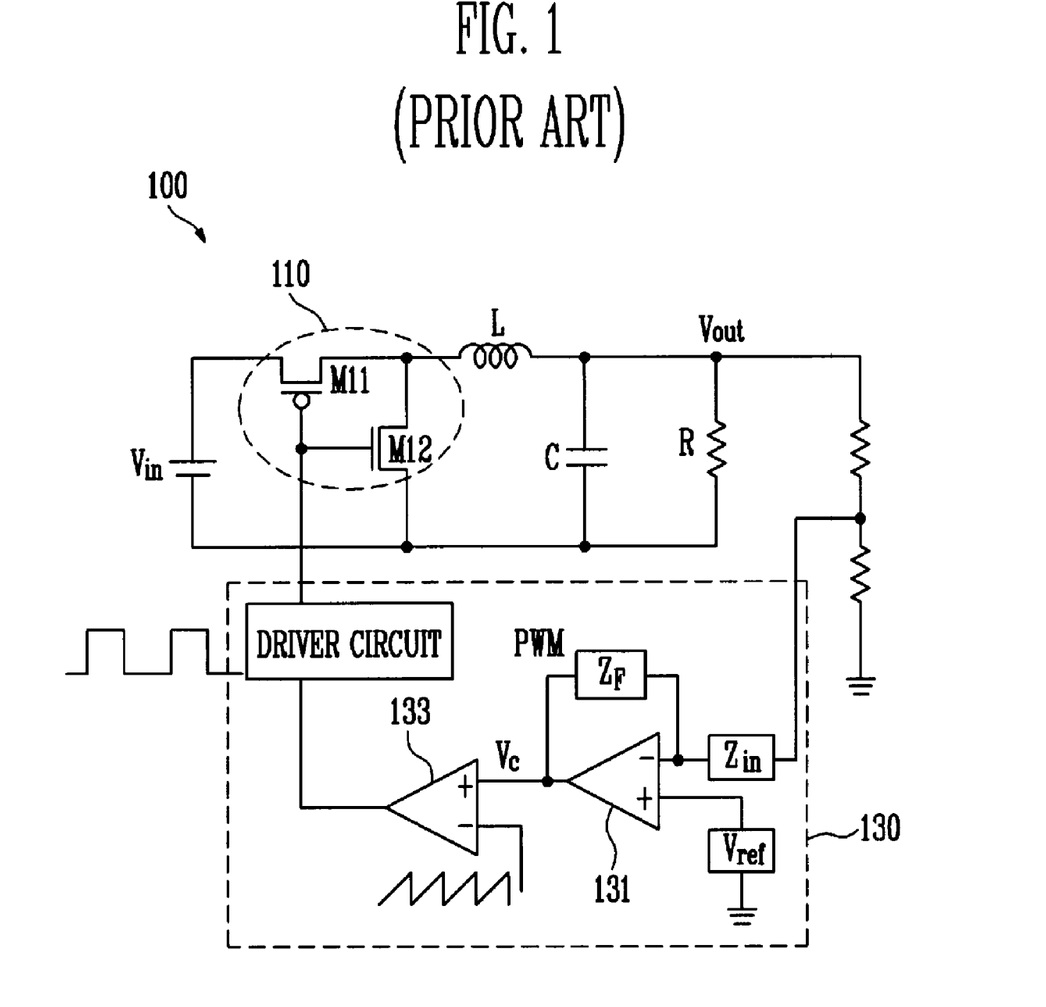
FIG. 1 illustrates a conventional switch mode power supply (SMPS) direct current-to-direct current (DC-DC) converter.

FIG. 1 illustrates a conventional SMPS DC-DC converter 100.

Referring to FIG. 1, in the conventional DC-DC converter 100, when CMOS transistors M11 and M12 of a switching circuit 110 alternately operate according to a pulse width modulation signal output from a pulse width modulator 130 and generate a square wave, an inductor L and a capacitor C filter the square wave and output DC voltage.

Here, the level of the DC voltage is determined by the pulse width modulation signal output from the pulse width modulator 130.

More specifically, when a difference amplifier 131 amplifies a difference between an output voltage Vout and a reference voltage and outputs the amplified difference, a comparator 133 compares the amplified difference with a triangle wave and determines a pulse width, and a square wave is generated according to the determined pulse width.

However, the DC-DC converter 100 inevitably has switching loss, conduction loss and control loss as described below.

First, the switching loss includes a loss caused by parasitic capacitance of the CMOS transistors M11 and M12, an overlap loss generated at a position at which voltage and current overlap during a switch transition, and so on.

Second, the conduction loss includes a loss caused by on-resistance when the CMOS transistors M11 and M12 are conducted, a loss caused by equivalent series resistance (ESR) of the inductor L and the capacitor C, and so on.

Third, the control loss includes a loss caused by pulse width modulation of the pulse width modulator 130.

While the switching loss and the control loss are uniformly generated regardless of output current, the conduction loss increases as the output current increases.

For this reason, to reduce the conduction loss, the CMOS transistors M11 and M12 used as a switching device are designed to have a large width. In this case, however, the chip size and power consumption increase.

SUMMARY OF THE INVENTION

The present invention is directed to providing a small switching circuit capable of reducing conduction loss in a normal mode using a dynamic threshold voltage device as a switching device, and a small-size high-efficiency direct current-to-direct current (DC-DC) converter for portable devices including the switching circuit.

One aspect of the present invention provides a switching circuit comprising a normal mode operation unit, the normal mode operation unit including: first and second dynamic threshold-complementary metal oxide semiconductor (DT-CMOS) transistors having a gate and a body connected with each other, and having a threshold voltage reduced in a normal mode and restored in a standby mode; and diode-connected first and second MOS transistors connected between the gate and the body of the first and second DT-CMOS transistors, and further reducing the threshold voltage of the first and second DT-CMOS transistors in the normal mode.

Another aspect of the present invention provides a small-size high-efficiency DC-DC converter for portable devices comprising a switching circuit for generating a square wave, an inductor and a capacitor for filtering the square wave generated by the switching circuit and outputting a DC voltage, and a pulse width modulator for generating a pulse width modulation signal for adjusting a level of the DC voltage and outputting it to the switching circuit. Here, the switching circuit includes a normal mode operation unit, and the normal mode operation unit includes: first and second DT-CMOS transistors having a gate and a body connected with each other, and having a threshold voltage reduced in a normal mode and restored in a standby mode; and diode-connected first and second MOS transistors connected between the gate and the body of the first and second DT-CMOS transistors, and further reducing the threshold voltage of the first and second DT-CMOS transistors in the normal mode.

When a low-level and high-level operation voltage are respectively applied to the gate of the first and second DT-CMOS transistors, a body voltage of the first DT-CMOS transistor decreases, a body voltage of the second DT-CMOS transistor increases, and the threshold voltages of the first and second DT-CMOS transistors are reduced. Here, the threshold voltage of the first and second DT-CMOS transistors may be further reduced to the extent of a turn-on voltage of the diode-connected first and second MOS transistors. In the normal mode, reduction of the threshold voltage of the first and second DT-CMOS transistors may lead to reduction in an on-resistance of the first and second DT-CMOS transistors, and conduction loss caused by the on-resistance may be reduced. Also, current drivability of the first and second DT-CMOS transistors may increase, and operating speed may increase.

The first DT-CMOS transistor may be a p-type MOS (PMOS) transistor, the second DT-CMOS transistor may be an n-type MOS (NMOS) transistor, and the first and second DT-CMOS transistors may be formed together on one bulk semiconductor substrate. Here, a deep n-type well may be additionally formed in a region of the bulk semiconductor substrate in which the second DT-CMOS transistor is formed, and the n-type body of the first DT-CMOS transistor may be separated from the p-type body of the second DT-CMOS transistor by the deep n-type well.

The switching circuit may further include a standby mode operation unit for reducing power consumption in the standby mode, and the standby mode operation unit may include: first and second inverters for inverting an input operation voltage and outputting the inverted operation voltage; and third and fourth MOS transistors connected with output terminals of the first and second inverters, and in the standby mode, respectively connecting the bodies of the first and second DT-CMOS transistors with a power supply terminal and a ground terminal and increasing the threshold voltage of the first and second DT-CMOS transistors.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention.

Figure 2:
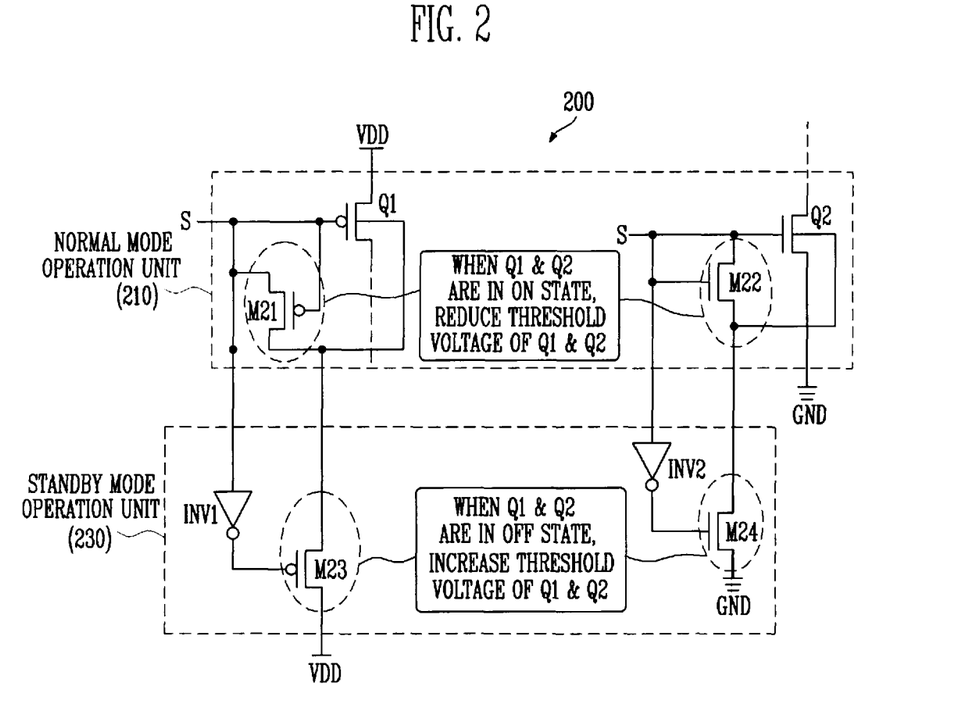
FIG. 2 illustrates a switching circuit employing a dynamic threshold voltage device according to an exemplary embodiment of the present invention.

FIG. 2 illustrates a switching circuit 200 employing a dynamic threshold voltage device according to an exemplary embodiment of the present invention.

Referring to FIG. 2, the switching circuit 200 according to an exemplary embodiment of the present invention includes a normal mode operation unit 210 that operates in a normal mode, and a standby mode operation unit 230 that operates in a standby mode.

The normal mode operation unit 210 includes first and second dynamic threshold-complementary metal oxide semiconductor (DT-CMOS) transistors Q1 and Q2 having a dynamic threshold voltage and diode-connected first and second MOS transistors M21 and M22, and the standby mode operation unit 230 includes first and second inverters INV1 and INV2 and third and fourth MOS transistors M23 and M24.

For convenience, it is assumed that the first DT-CMOS transistor Q1 is a p-type MOS (PMOS) transistor, the second DT-CMOS transistor Q2 is an n-type MOS (NMOS) transistor, and the diode-connected first and second MOS transistors M21 and M22 are PMOS transistor and NMOS transistor, respectively. Also, it is assumed that the third MOS transistor M23 is a PMOS transistor, and the fourth MOS transistor M24 is an NMOS transistor.

The gate and body of the first DT-CMOS transistor Q1 are directly connected through the first MOS transistor M21. The source and gate of the first MOS transistor M21 are connected with the gate of the first DT-CMOS transistor Q1, and the drain of first MOS transistor M21 is connected with the body of the first DT-CMOS transistor Q1.

The gate and body of the second DT-CMOS transistor Q2 are directly connected through the second MOS transistor M22. The drain and gate of the second MOS transistor M22 are connected with the gate of the second DT-CMOS transistor Q2, and the source of second MOS transistor M22 is connected with the body of the second DT-CMOS transistor Q2.

In other words, the gate voltage and body voltage of the first and second DT-CMOS transistors Q1 and Q2 decrease or increase, together. Thus, when an operation voltage S of a low level is applied to the gate of first DT-CMOS transistor Q1, the first DT-CMOS transistor Q1 and the first MOS transistor M21 are turned on, the body voltage of first DT-CMOS transistor Q1 decreases accordingly, and the threshold voltage is reduced. Similarly, when an operation voltage S of a high level is applied to the gate of second DT-CMOS transistor Q2, the second DT-CMOS transistor Q2 and the second MOS transistor M22 are turned on, the body voltage of second DT-CMOS transistor Q2 increases accordingly, and the threshold voltage is reduced. Therefore, the on-resistance is also reduced.

Consequently, compared with a conventional CMOS transistor, the first and second DT-CMOS transistors Q1 and Q2 can reduce conduction loss and improve operating speed due to current drivability increased by the low threshold voltage.

Also, when the operation voltage S of high level and a low level is applied to the gates of the first and second DT-CMOS transistors Q1 and Q2 respectively, the original threshold voltage is restored, and leakage current can be minimized.

Using the DT-CMOS transistors Q1 and Q2 having a dynamic threshold voltage as a switching device, the switching circuit 200 according to an exemplary embodiment of the present invention maintains a low threshold voltage in the normal mode to improve current drivability while reducing conduction loss, and maintains a high threshold voltage in the standby mode to minimize power consumption. This will be described later in more detail.

Meanwhile, the first and second DT-CMOS transistors Q1 and Q2 are separately formed on one semiconductor substrate. This will be described below in more detail.

Figure 3:
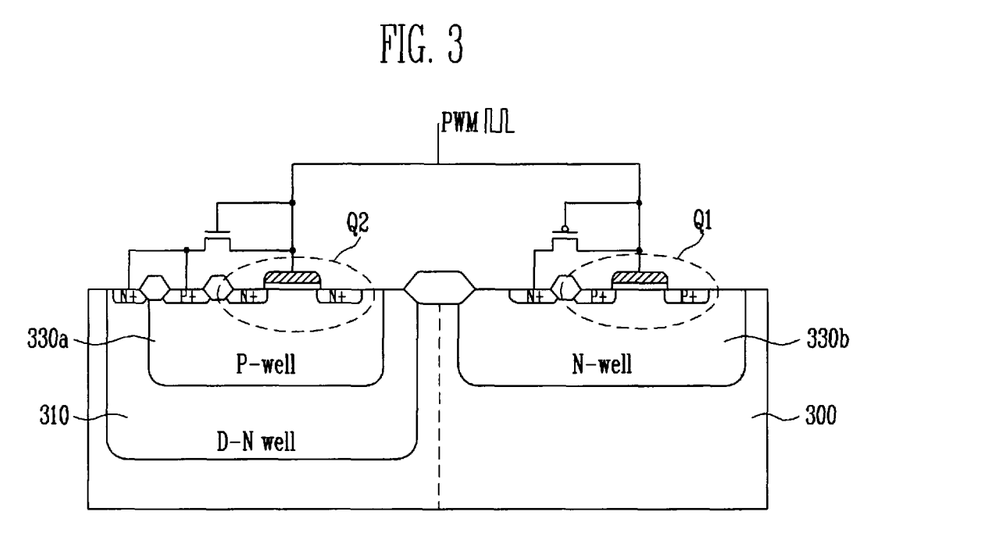
FIG. 3 is a diagram for illustrating a method of fabricating first and second dynamic threshold-complementary metal oxide semiconductor (DT-CMOS) transistors of FIG. 2.

FIG. 3 is a diagram for illustrating a method of fabricating the first and second DT-CMOS transistors of FIG. 2.

Referring to FIG. 3, the p-type first DT-CMOS transistor Q1 and the n-type second DT-CMOS transistor Q2 having a dynamic threshold voltage are formed together on a semiconductor substrate 300.

To form the different types of DT-CMOS transistors Q1 and Q2 on the one semiconductor substrate 300 as mentioned above, a p-type body 330a and an n-type body 330b should be separated. To this end, according to an exemplary embodiment of the present invention, a deep n-type well 310 is additionally formed in a region of the semiconductor substrate 300 in which the second DT-CMOS transistor Q2 will be formed.

In other words, the p-type body 330a of the second DT-CMOS transistor Q2 is isolated by the deep n-type well 310. Thus, the different types of first and second DT-CMOS transistors Q1 and Q2 can be simply fabricated on the bulk semiconductor substrate 300 using a conventional CMOS process.

Figure 4A:
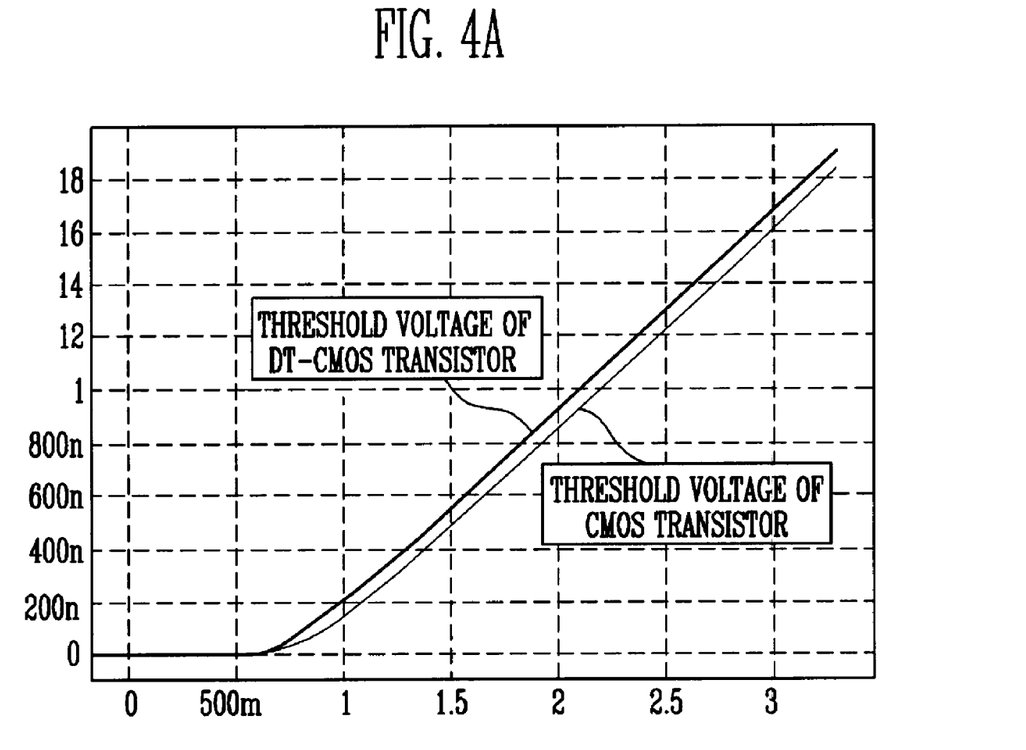
FIGS. 4A and 4B are graphs showing threshold voltages and voltage-current characteristics of a DT-CMOS transistor according to an exemplary embodiment of the present invention and a conventional CMOS transistor.
Figure 4B:
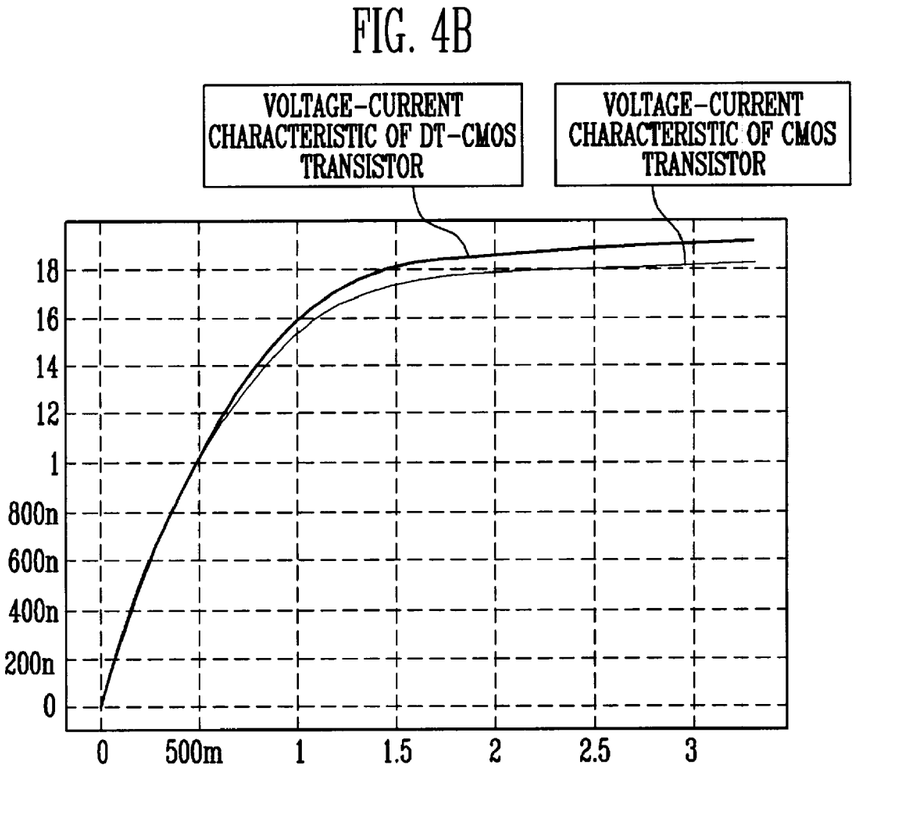

FIGS. 4A and 4B are graphs showing threshold voltages and voltage-current characteristics of a DT-CMOS transistor according to an exemplary embodiment of the present invention and a conventional CMOS transistor.

As shown in FIGS. 4A and 4B, a DT-CMOS transistor according to an exemplary embodiment of the present invention has a lower threshold voltage than a conventional CMOS transistor, and can conduct more current at the same voltage level.

Referring back to FIG. 2, when the operation voltage S of a low level is applied to the gate of first DT-CMOS transistor Q1 or the operation voltage S of a high level is applied to the gate of second DT-CMOS transistor Q2, that is, in the normal mode, the first DT-CMOS transistor Q1 and the diode-connected first MOS transistors M21 switch to the on-state, or the second DT-CMOS transistor Q2 and the second MOS transistor M22 switch to the on-state.

Thus, the gate and body of the first and second DT-CMOS transistors Q1 and Q2 are connected through the diode-connected first and second MOS transistors M21 and M22, and threshold voltages of the first and second DT-CMOS transistors Q1 and Q2 are reduced.

In addition, the threshold voltages of the first and second DT-CMOS transistors Q1 and Q2 are further reduced to the extent of turn-on voltages of the diode-connected first and second MOS transistors M21 and M22.

When the threshold voltages of the first and second DT-CMOS transistors Q1 and Q2 are reduced as described above, on-resistances of the first and second DT-CMOS transistors Q1 and Q2 are reduced, and thus conduction loss caused by the on-resistances can be reduced. Reduction of the threshold voltages of the first and second DT-CMOS transistors Q1 and Q2 can also improve current drivability.

On the other hand, when the operation voltage S of a high level is applied to the gate of first DT-CMOS transistor Q1 or the operation voltage S of a low level is applied to the gate of second DT-CMOS transistor Q2, that is, in the standby mode, the first and second inverters INV1 and INV2 invert the operation voltage respectively and apply the inverted operation voltage to the third and fourth MOS transistors M23 and M24. Then, the third MOS transistor M23 is turned on, or the fourth MOS transistor M24 is turned on.

Here, the gate of the third MOS transistor M23 is connected with the output terminal of the first inverter INV1, the source is connected with a power supply VDD, and the drain is connected with the body of first DT-CMOS transistor Q1. And, the gate of the fourth MOS transistor M24 is connected with the output terminal of the second inverter INV2, the drain is connected with the body of the second DT-CMOS transistor Q2, and the source is connected with the ground terminal GND.

In other words, when the third MOS transistor M23 is turned on, the body of the first DT-CMOS transistor Q1 is connected with the power supply VDD, and when the fourth MOS transistor M24 is turned on, the body of the second DT-CMOS transistor Q2 is connected with the ground terminal GND.

When the bodies of the first and second DT-CMOS transistors Q1 and Q2 are respectively connected with the power supply VDD and the ground terminal GND as described above in the standby mode, the threshold voltages of the first and second DT-CMOS transistors Q1 and Q2 increase, and thus leakage current can be minimized.

Meanwhile, the switching circuit 200 can be employed in a DC-DC converter instead of the switching circuit 110 illustrated in FIG. 1. In this case, the switching circuit 200 can reduce conduction loss of the DC-DC converter to increase power conversion efficiency in the normal mode, and minimize power consumption to maximize a use time of a battery of a portable device in the standby mode.

In the normal mode, leakage current may be generated toward the bodies of the first and second DT-CMOS transistors Q1 and Q2. However, in a DC-DC converter operating at high output current, efficiency loss caused by on-resistances of the first and second DT-CMOS transistors Q1 and Q2 is larger than efficiency loss caused by the leakage current. Thus, in spite of the leakage current generated toward the bodies, overall power conversion efficiency increases due to reduction of conduction loss.

Figure 5:
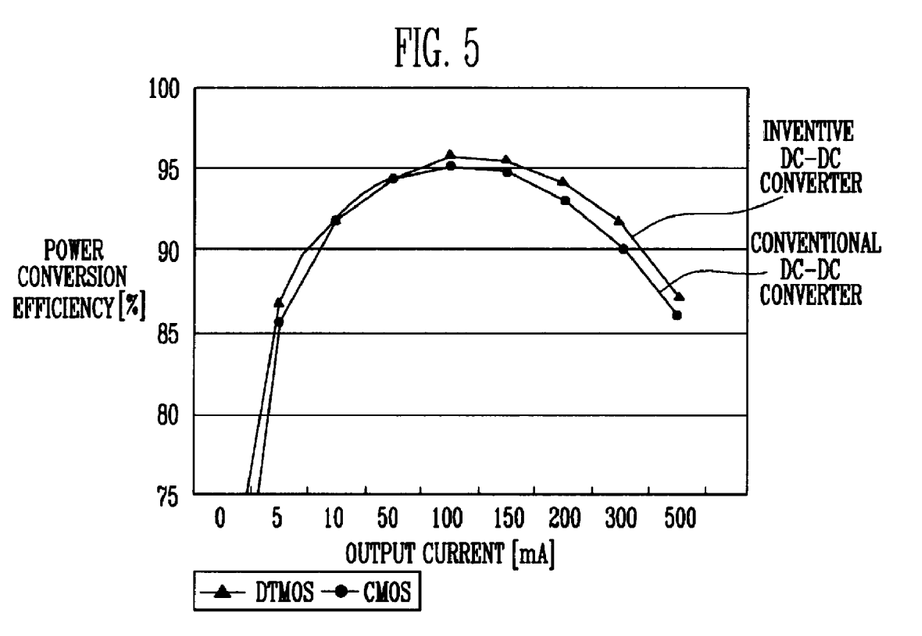
FIG. 5 is a graph showing efficiency of a DC-DC converter employing first and second DT-CMOS transistors as a switching device according to an exemplary embodiment of the present invention and a DC-DC converter employing a conventional CMOS transistor as a switching device.

FIG. 5 is a graph showing efficiency of a DC-DC converter employing first and second DT-CMOS transistors according to an exemplary embodiment of the present invention as a switching device and a DC-DC converter employing a conventional CMOS transistor as a switching device.

As seen from FIG. 5, the DC-DC converter according to an exemplary embodiment of the present invention shows power conversion efficiency increased by about 0.3% compared with the conventional DC-DC converter at an output current of 100 mA. With increase of the output current, power conversion efficiency further increases, and the DC-DC converter according to an exemplary embodiment of the present invention shows power conversion efficiency increased by about 2% at an output current of 500 mA.

Consequently, the DC-DC converter according to an exemplary embodiment of the present invention is expected to have higher power conversion efficiency than a conventional DC-DC converter at the same current, and suited for power supplies of portable devices that are gradually being miniaturized.

A switching circuit according to an exemplary embodiment of the present invention uses a DT-CMOS transistor having a dynamic threshold voltage as a switching device. Thus, in the normal mode, the switching circuit maintains a low threshold voltage and thus can reduce conduction loss while improving current drivability. Also, in the standby mode, the switching circuit maintains a high threshold voltage and thus can minimize power consumption.

For this reason, when the switching circuit according to an exemplary embodiment of the present invention is employed in a DC-DC converter, power conversion efficiency can be improved by reducing conduction loss in the normal mode, and power consumption can be minimized in the standby mode. Consequently, the DC-DC converter can maximize a use time of a battery of a portable device and can be useful in power supplies of portable devices that are gradually being miniaturized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A switching circuit comprising:
   a normal mode operation unit that includes:
   first and second dynamic threshold-complementary metal oxide semiconductor (DT-CMOS) transistors each having a gate connected with a body thereof and having a threshold voltage that is reduced in a normal mode and restored in a standby mode, the first DT-CMOS transistor being of a first-type MOS transistor and the second DT-CMOS transistor being of a second-type MOS transistor; and diode-connected first and second MOS transistors configured to further reduce the threshold voltage of the first and second DT-CMOS transistors in the normal mode, the diode-connected first MOS transistor being of the first-type MOS transistor and connected between the gate and the body of the first DT-CMOS transistor, the diode-connected second MOS transistor being of the second-type MOS transistor and connected between the gate and the body of the second DT-CMOS transistor; and a standby mode operation unit that reduces power consumption in the standby mode and that includes:
third and fourth MOS transistors, the third MOS transistor connecting the body of the first DT-CMOS transistor with a power supply terminal, the fourth MOS transistor connecting the body of the second DT-CMOS transistor with a ground terminal; and
first and second inverters, the first inverter coupled between the gate of the first DT-CMOS transistor and a gate of the third MOS transistor, the second inverter coupled between the gate of the second DT-CMOS transistor and a gate of the fourth MOS transistor.

2. The switching circuit of claim 1, wherein when a low-level and high-level operation voltage are respectively applied to the gate of the first and second DT-CMOS transistors, a body voltage of the first DT-CMOS transistor decreases, a body voltage of the second DT-CMOS transistor increases, and the threshold voltages of the first and second DT-CMOS transistors are reduced.

3. The switching circuit of claim 2, wherein the threshold voltage of the first and second DT-CMOS transistors is further reduced to the extent of a turn-on voltage of the diode-connected first and second MOS transistors.

4. The switching circuit of claim 3, wherein in the normal mode, reduction of the threshold voltage of the first and second DT-CMOS transistors reduces an on-resistance of the first and second DT-CMOS transistors, and conduction loss caused by the on-resistance is reduced.

5. The switching circuit of claim 1, wherein the first DT-CMOS transistor is a p-type MOS (PMOS) transistor, the second DT-CMOS transistor is an n-type MOS (NMOS) transistor, and the first and second DT-CMOS transistors are formed together on one bulk semiconductor substrate.

6. The switching circuit of claim 5, wherein a deep n-type well is additionally formed in a region of the bulk semiconductor substrate in which the second DT-CMOS transistor is formed, and the n-type body of the first DT-CMOS transistor is separated from the p-type body of the second DT-CMOS transistor by the deep n-type well.

7. The switching circuit of claim 1, wherein a source and a gate of the diode-connected first MOS transistor are connected with the gate of the first DT-CMOS transistor, and a drain of the diode-connected first MOS transistor is connected with the body of the first DT-CMOS transistor.

8. The switching circuit of claim 1, wherein a drain and a gate of the diode-connected second MOS transistor are connected with the gate of the second DT-CMOS transistor, and a source of the diode-connected second MOS transistor is connected with the body of the second DT-CMOS transistor.

9. The switching circuit of claim 1, wherein the third MOS transistor is of the first-type MOS transistor and the fourth MOS transistor is of the second-type MOS transistor, and wherein:
the first and second inverters for invert an input operation voltage and output the inverted operation voltage; and
the third and fourth MOS transistors increase the threshold voltage of the first and second DT-CMOS transistors.

10. The switching circuit of claim 9, wherein the third MOS transistor is a p-type MOS (PMOS) transistor, the fourth MOS transistor is an n-type MOS (NMOS) transistor, gates of the third and fourth MOS transistors are respectively connected with the output terminals of the first and second inverters, drains are respectively connected with the bodies of the first and second DT-CMOS transistors, and sources are respectively connected with the power supply terminal and the ground terminal.

11. A small-size high-efficient direct current-to-direct current (DC-DC) converter for portable devices, comprising:
a switching circuit that generates a square wave, the switching circuit comprising:
a normal mode operation unit that includes:
first and second dynamic threshold-complementary metal oxide semiconductor (DT-CMOS) transistors each having a gate connected with a body thereof and having a threshold voltage that is reduced in a normal mode and restored in a standby mode, the first DT-CMOS transistor being of a first-type MOS and the second DT-CMOS transistor being of a second-type MOS, and
diode-connected first and second MOS transistors configured to further reduce the threshold voltage of the first and second DT-CMOS transistors in the normal mode, the diode-connected first MOS transistor being of the first-type MOS transistor and connected between the gate and the body of the first DT-CMOS transistor, the diode-connected second MOS transistor being of the second-type MOS transistor and connected between the gate and the body of the second DT-CMOS transistor; and
a standby mode operation unit that includes:
third and fourth MOS transistors, the third MOS transistor being of the first-type MOS transistor and connecting the body of the first DT-CMOS transistor with a power supply terminal, the fourth MOS transistor being of the second-type MOS transistor and connecting the body of the second DT-CMOS transistor with a ground terminal; and
first and second inverters, the first inverter coupled between the gate of the first DT-CMOS transistor and a gate of the third MOS transistor, the second inverter coupled between the gate of the second DT-CMOS transistor and a gate of the fourth MOS transistor;
an inductor and a capacitor that filter the square wave generated by the switching circuit and output a DC voltage; and
a pulse width modulator that generates a pulse width modulation signal that adjusts a level of the DC voltage and outputs the pulse width modulation signal to the switching circuit.

12. The small-size high-efficient DC-DC converter of claim 11, wherein in the normal mode, reduction of the threshold voltage of the first and second DT-CMOS transistors leads to reduction of an on-resistance of the first and second DT-CMOS transistors, and conduction loss caused by the on-resistance is reduced.

13. The small-size high-efficient DC-DC converter of claim 11, wherein the first DT-CMOS transistor is a p-type MOS (PMOS) transistor, the second DT-CMOS transistor is an n-type MOS (NMOS) transistor, and the first and second DT-CMOS transistors are formed together on one bulk semiconductor substrate.

14. The small-size high-efficient DC-DC converter of claim 13, wherein a deep n-type well is additionally formed in a region of the bulk semiconductor substrate in which the second DT-CMOS transistor is formed, and the n-type body of the first DT-CMOS transistor is separated from the p-type body of the second DT-CMOS transistor by the deep n-type well.

15. The small-size high-efficient DC-DC converter of claim 11, wherein the third MOS transistor is of the first-type MOS transistor and the fourth MOS transistor is of the second-type MOS transistor, and wherein:
 the first and second inverters invert an input operation voltage and output the inverted operation voltage; and
 the third and fourth MOS transistors increase the threshold voltage of the first and second DT-CMOS transistors.

* * * * *